Aug. 22, 1961 R. D. STAMM 2,996,925

PUSHBUTTON TUNER

Filed Oct. 2, 1959 3 Sheets-Sheet 1

INVENTOR.
RUSSELL D. STAMM

BY James and Franklin

ATTORNEYS

INVENTOR.
RUSSELL D. STAMM

BY James and Franklin

ATTORNEYS

Aug. 22, 1961 R. D. STAMM 2,996,925

PUSHBUTTON TUNER

Filed Oct. 2, 1959 3 Sheets-Sheet 3

INVENTOR.
RUSSELL D. STAMM

BY James and Franklin

ATTORNEYS

United States Patent Office 2,996,925
Patented Aug. 22, 1961

2,996,925
PUSHBUTTON TUNER

Russell D. Stamm, Livingston, N.J., assignor to General Instrument Corporation, Newark, N.J., a corporation of New Jersey
Filed Oct. 2, 1959, Ser. No. 844,025
12 Claims. (Cl. 74—10.33)

The present invention relates to the construction of a pushbutton tuner, and in particular to such a tuner of minimal dimensions.

The use of pushbutton tuning devices for radio sets and the like is quite widespread. They commonly take the form of a plurality of slidably mounted keys each of which carries an adjustably positionable cam selectively engageable, as each pushbutton is individually depressed, with driving mechanism directly connected to the tuning elements of the radio set. Manual means are also provided for moving the tuning element, and in order to minimize the force required to move each pushbutton to its operative position the manual tuning drive is disconnected or declutched from the tuning device when pushbutton control is desired. Usually the disconnection or declutching is automatically accomplished as the pushbutton is moved to its operative position.

The functions which a pushbutton structure must accomplish are therefore relatively complex, and the manufacturer of pushbutton assemblies is therefore relatively costly. Moreover, these assemblies are comparatively bulky.

Until relatively recently the size of the pushbutton assemblies was not a factor, since the radio sets themselves were much larger. Today, however, there is a definite trend toward miniaturization of radio sets, whether those sets are transistorized or utilize vacuum tubes. There has been a corresponding demand for a reduction in size in the pushbutton assemblies which control the tuning of those sets, partly to maintain a proper sense of proportion between the size of the receiving set itself and the size of the mechanism which controls the set and partly because of increasingly restrictive space requirements in the structures into which the radio sets are to be received.

A major factor limiting the size of the pushbutton assemblies in the past has been the requirement that when a pushbutton is depressed it should actuate a mechanism which declutches the manual tuning drive from the tuning element. The presence of such mechanism has added appreciably to the depth of the overall pushbutton assembly. In accordance with the present invention, and by virtue of a novel construction of the cooperating parts, the overall depth of the assembly has been appreciably decreased. This has been accomplished by so constructing the declutching member and the pushbutton key as to permit the key to enter the declutching member as it moves the latter to declutching position without projecting beyond the declutching member when the key has been moved to its inner operative position. Thus no space need be left at the rear of the assembly for any protruding portions of the pushbutton keys when the latter are pushed in.

The width of the pushbutton assembly is, of course, determined by the number of pushbuttons desired and by the necessity of providing sufficient clearance between adjacent pushbuttons so that each may operate without interference. Each pushbutton must not only carry an adjustably positionable cam but must also carry mechanism which locks the cam in desired position and which releases the cam for readjustment when that is desired. This latter mechanism is movable relative to the body of the pushbutton key, and it must have a certain degree of movement if it is to attain its designed function. Usually this movement is in a direction toward adjacent keys. Sufficient clearance must be provided between adjacent keys to permit such movement. This constitutes a definite limitation on the spacing between the keys, and hence on the overall width of the assembly.

I have, without reducing the amount of movement of the locking mechanism relative to the key body, appreciably reduced the maximum degree to which the locking mechanism will extend beyond the key body, thereby permitting an appreciably closer spacing of the keys than has heretofore been thought possible. In the past the movement of the locking mechanism has been beyond the body of the pushbutton key itself. In accordance with the present invention an appreciable portion of the movement of the locking mechanism occurs within the space otherwise taken up by the key body itself, and to that extent the degree to which the locking mechanism projects from the key body is reduced. To this end the key body is provided wih an aperture into which a portion of the locking element is receivable, and the part which moves the locking element between locking and unlocking positions also passes through that aperture.

By reason of these changes in construction the size of the pushbutton assembly is reduced in depth and in width, thereby reducing the space which the tuning assembly occupies and reducing its cost, without any sacrifice in sturdiness or reliability.

To the accomplishment of the above, and to such other objects as may hereinafter appear, the present invention relates to the construction of a pushbutton assembly as defined in the appended claims and as described in the specification, in which:

Figure 3:
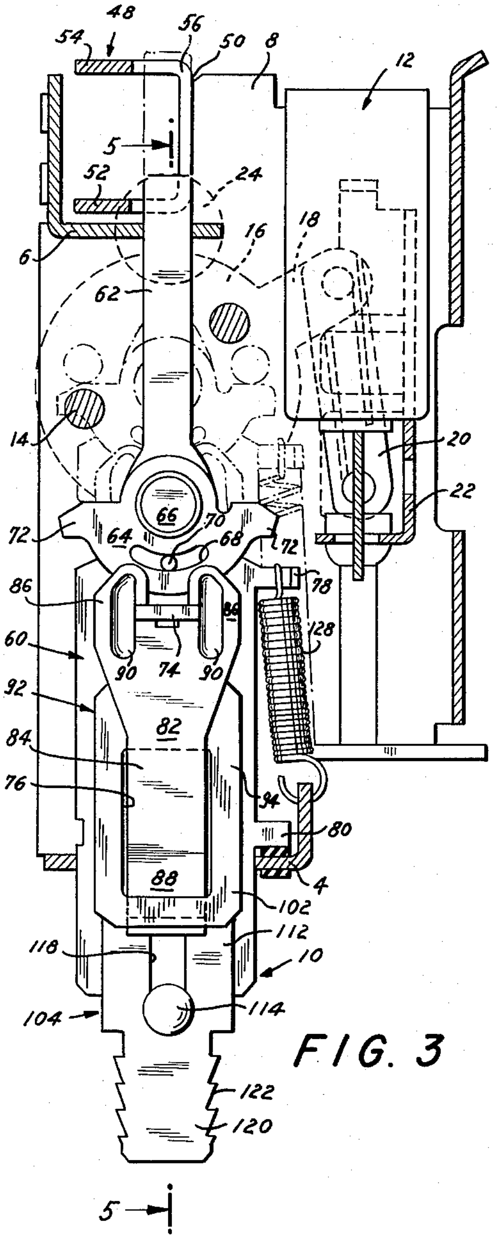
FIG. 3 is a cross sectional view taken along the line 3—3 of FIG. 1.
Figure 4:
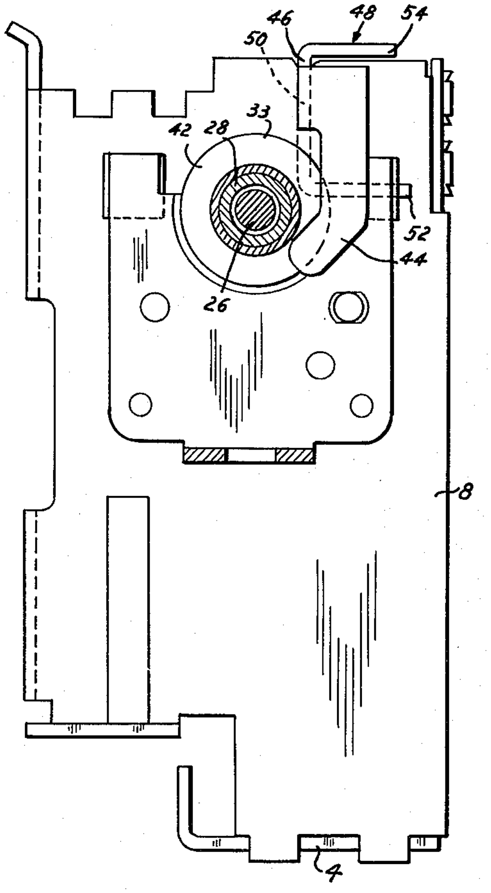
FIG. 4 is a cross sectional view taken along the line 4—4 of FIG. 1, the pushbutton itself being omitted for purposes of clarity.

As here specifically disclosed the pushbutton tuning device comprises a housing or chassis having a front wall 4, a rear key guide plate 6 and side walls 8. A plurality of pushbutton units generally designated 10 are arranged in side by side relation for selective movement between projected and depressed positions. For purposes of simplification, only one such key 10 is shown in the drawings. Mounted on the side wall 8 is the tuning element generally designated 12 (shown only in FIG. 3, for purposes of simplification), which may take any of a variety of well known forms—permeability-tuned coils, variable condensers, and the like. A pair of rocker arms 14 extend across the width of the chassis between the walls 4 and 6, and their ends are secured in disk 16 (omitted from FIGS. 1 and 2) which is rotatably mounted on side wall 8. The disk 16 is provided with an arm 18 (see FIG. 3) which is connected by link 20 to the movable part of the tuning element 12, here shown as sliding bracket 22 on which tuning cores may be mounted. Consequently it will be seen that rotational positioning of the rocker arms 14 will, via the disk 16, the arm 18 and the link 20, appropriately position the tuning cores and thus control the tuning of the radio set adapted to be associated therewith. The disk 16 has a toothed periphery which meshes with gear 24 which rotates with shaft 26 journaled in bushing 28 extending out from the side wall 8, the outer end of the shaft 26 being connected to disk 30 which carries a frictional clutch facing 32 which may be free floating on the outer end of the bushing 28. A second bushing 33 is rotatably and slidably mounted on the bushing 28, and carries clutch plate 34 rotatably fast therewith. The clutch plate 34 has a toothed flange 36 engaging with pinion 38 on the end of manual drive shaft 40, the shaft 40 being rotatably mounted in bracket 42 extending from the side wall 8 and having a limited degree of lateral movement relative thereto. The bushing 33 is further provided with a groove 42 within which finger 44 is received, that finger being part of an extension 46 of the declutching member generally designated 48.

The declutching member 48 is mounted at the rear of the chassis 2, behind the guide plate 6, and has a substantially U-shaped cross section defined by a top wall 50 and depending front and rear walls 52 and 54 respectively. The top wall 50 and the upper portions of the rear walls 52 and 54 are provided with a plurality of passages 56, one for each of the pushbuttons 10, one side surface 58 of each of these passages 56 being curved to define a cam surface for a purpose hereinafter to be described.

Each of the pushbuttons 10 comprises a key body generally designated 60 having a rearwardly extending tip 62. The front end of the body 60 is slidably mounted in the front chassis wall 4 and the rearwardly extending tip 62 is slidably mounted in the guide plate 6 and registers with a passage 56 in the declutching member 48. A cam 64 is rotatably mounted on the key body 60 by means of rivet 66 and is provided with an arcuate slot 68 into which projection 70 on the body 60 is received, thereby limiting the degree of rotative movement of the cam 64. The cam is provided with wings 72 so located as to be in line with the rocker arms 14. The key body 60 is provided with a T-shaped lateral projection 74 and, near its front end, with a large rectangular opening 76. A notched arm 78 extends upwardly and outwardly from the body 60 adjacent its rearward end, and a stop 80 extends laterally out therefrom adjacent its forward end.

A cam locking lever generally designated 82 is provided, that locking lever comprising a body portion 84, a pair of rearwardly extending and laterally spaced fingers 86 and a depressed forward portion 88. The fingers 86 may be provided with protrusions 90. The locking lever 82 is positioned with its fingers 86 straddling the neck of the T-shaped body projection 74, the head of that projection extending over the lever 82 and thus defining a fulcrum therefor, the lower surfaces of the protrusions 90 engaging the cam 64. The depressed forward portion 88 of the locking lever 82 is then located over the aperture 76 in the key body 60, that aperture being appreciably larger than the locking lever portion 88, so that, as may clearly be seen in FIG. 6, the forward portion 88 is freely receivable within the aperture 76 when the locking lever 82 pivots in a clockwise direction about its fulcrum defined by the head of the projection 74.

Figures 5, 6, 7:
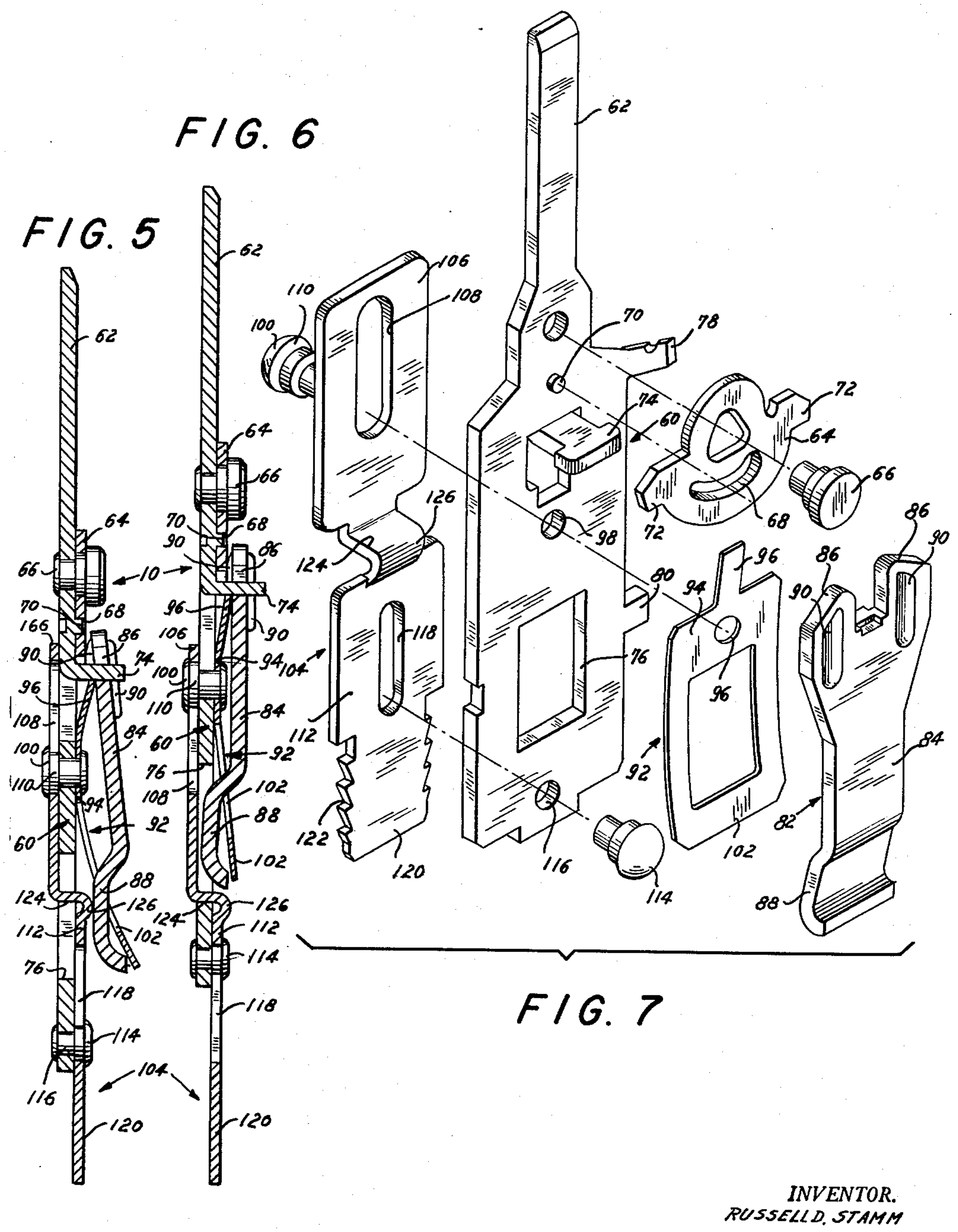
FIG. 5 is a cross sectional view of a pushbutton key taken along the line 5—5 of FIG. 3, the parts being shown in cam-locking position.
FIG. 6 is a view similar to FIG. 5 but with the parts shown in cam-unlocking position.
FIG. 7 is a three-quarter perspective exploded view of the parts of the pushbutton key.

A spring generally designated 92 engages the locking lever 82 and urges it against its fulcrum and in its clockwise pivoted position shown in FIG. 6, in which position the cam 64 is released for rotation about the pivot 66. That spring 92 comprises a part 94 having an aperture 96 registering with aperture 98 in the key body 60, a rivet 100 passing through the apertures 96 and 98 and securing the spring part 94 to the key body 60. Extending rearwardly from the spring part 94 is a finger 96 which is biased outwardly to engage the locking lever 82 and press it against the head of the projection 74. Extending in the other direction from the spring part 94 is a looped spring part 102 which extends around the portion 84 of the locking lever 82 and engages the forwardly extending portion 88 thereof, thereby to urge that portion 88 toward the key body 60 and into the aperture 76.

The key extension generally designated 104 is slidably mounted on the key body 60 and is adapted to control the action of the locking lever 84 in locking the cam 64 in adjusted position or releasing it for adjustment to a new position. The extension 104 comprises a first part 106 mounted on the undersurface of the key body 60 and provided with an elongated slot 108 through which the rivet 100 passes, that rivet being provided with a shoulder 110 so as to retain the part 106 against the key body 60. A second part 112 of the key extension 104 slides over the upper surface of the key body 60, being there retained by rivet 114 which passes through aperture 116 in the key body 60 and through the elongated body slot 118 in the extension part 112. The extension part 112 is provided with a forwardly extending section 120 having serrated side edges 122, to which section a button or the like may be secured. The extension 104 is further provided with a third portion 124 which connects the first and second portions 106 and 112 by passing through the aperture 76 in the key body 60, that third portion 124 having a raised section 126 adapted to engage the forwardly extending part 88 of the locking lever 82.

Each of the key assemblies 10 is mounted in the chassis 2 with the part 62 slidably passing through guide plate 6 and entering a passage 56 in the declutching member 48 and with the forward portion of the key body 60 slidably passing through and guided by the front wall 4. A tension spring 128 is connected between the front wall 4 and the notched arm 78 on the key body 60, thus tending to pull the key assembly 10 forwardly until the stop 80 engages the front wall 4.

Figures 1, 2:
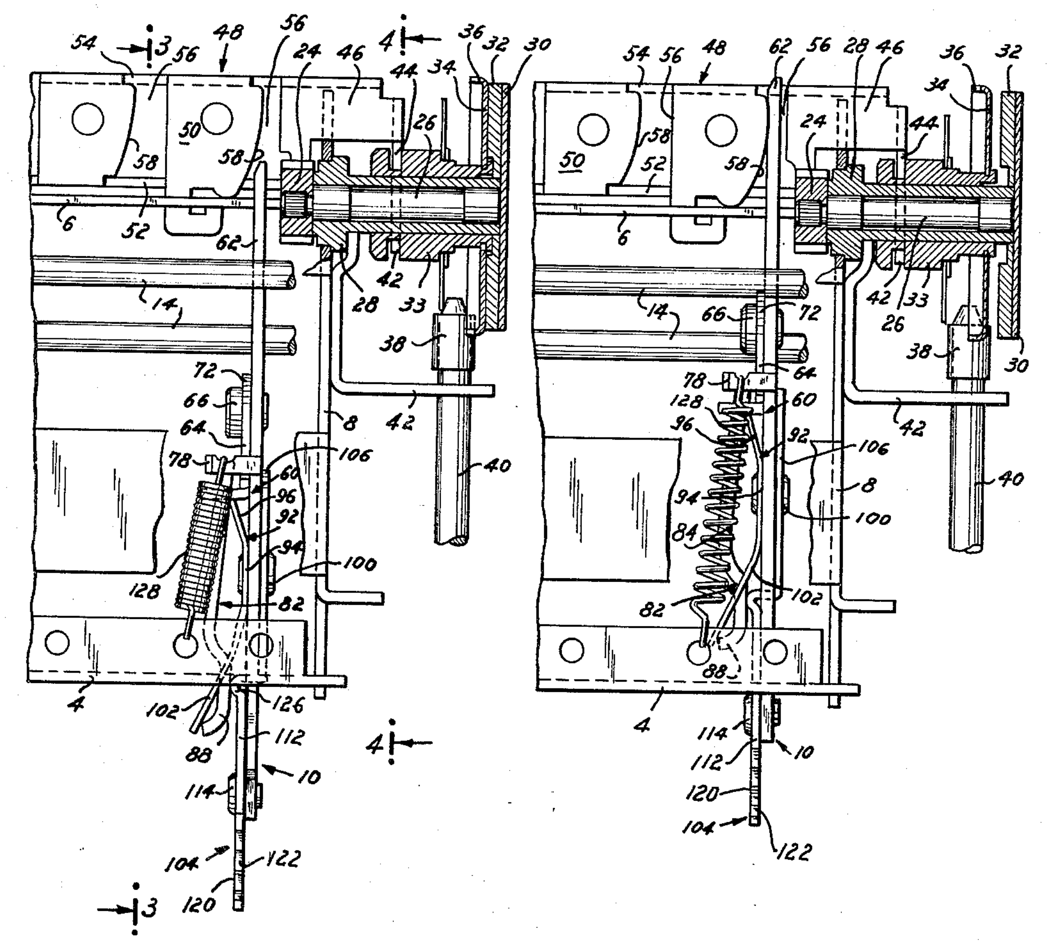
FIG. 1 is a top plan view of a portion of a pushbutton tuner constructed according to the present invention, with parts thereof broken away and cross sectioned, the pushbutton being shown in its outer or inoperative position.
FIG. 2 is a view similar to FIG. 1 but showing the pushbutton in its depressed inner or operative position.

With the pushbuttons 10 all in their forward or outwardly projection positions the declutching member 48 is biased in any appropriate manner to its right hand position shown in FIG. 1, thereby pressing clutch facing 32 between clutch plate 34 and disk 30. This operatively connects the external drive shaft 40 to the tuning element 12, permitting manual tuning of the set. Such tuning will result in rotation of the disk 16 and movement of the rocker arms 14.

To set the cam 64 on a pushbuton assembly 10 to a position corresponding to the tuning of a particular station, the key extension 104 is pulled out forwardly relative to the key body 60 to the position shown in FIG. 6. The portion 126 of the extension 104 is therefore moved forwardly beyond the portion 88 of the locking lever 82 and the spring portion 102 causes that locking lever 82 to pivot about its fulcrum in a clockwise direction as viewed in FIG. 6, the portion 88 thereof entering the aperture 76 in the key body 60 and the fingers 86 thereof moving away from the cam 64 and thus releasing that cam 64 for ready rotation about the rivet 66.

Next the pushbutton assembly 10 is moved inwardly. The rearwardly extending portion 62 of the key body 60 moves into the passage 56 in the declutching member 48 corresponding thereto, engages the cam surface 58 defined by a side surface of that passage, and moves the declutching member 48 to the left against the action of the biasing means. The declutching member 48, in thus moving to the left, will carry with it the bushing 33 and the clutch plate 36, thus declutching the shaft 26 from the external drive shaft 40. As the pushbutton assembly 10 continues to move inwardly, the wings 72 of the cam 64 will engage the rocker arms 14 and, since the cam 64 is conditioned to be freely rotatable, the cam 64 will take up a position corresponding to the position of the rocker arms 14.

After the key body 10 has been fully moved inwardly the key extension 104 is then forced inwardly relative to the key body 60, moving to the position shown in FIG. 5. In that position its portion 126 will engage the under-side of the forwardly extending portion 88 of the locking lever 82 and force that locking lever to pivot in a counter-clockwise direction, firmly pressing its fingers 86 against the cam 64 so as to lock that cam in rotative position.

The pushbutton is then released, the spring 128 causes it again to project outwardly, and the next time it is depressed the engagement between the wings 72 on its cam 64, now locked against rotation, with the rocker arms 14 will positively move those rocker arms 14 to a position corresponding to the rotative position of the cam 64, while at the same time declutching the external drive shaft 40 so that the rocker arms 14 can be moved to desired position with a minimum of effort.

It will be noted particularly from a comparison of FIG. 1 with FIG. 2 that when the pushbutton 10 is in its innermost position it does not project to any appreciable degree beyond the rear of the chassis 2 or the rear of the declutching member 48. Thus no space need be provided for clearance at the rear of the unit. The depth dimension of the unit is determined solely by the degree to which the pushbutton need be moved to produce a tuning effect and by the dimensions of the declutching member 48 itself.

As may clearly be seen from FIGS. 1, 5 and 6, the maximum spacing which must be provided laterally between individual pushbuttons 10 is determined by the degree to which the locking lever 84 projects laterally from the key body 60 when in locking position. An inescapable amount of movement must be permitted the locking lever 84 between its locking and unlocking positions if the clutch 64 is to be securely locked in position and released for adjustment as desired. By permitting the forwardly extending end 88 of the locking lever 82 to be freely received within the aperture 76 in the key body 60 a substantial part of the lateral movement of the locking lever portion 88 takes place within the thickness of the key body 60. Hence, without any sacrifice in the total amount of movement of the locking lever 82 between locking and unlocking position, the distance to which end 88 of the locking lever 82 extends laterally from the key body 60 when the locking lever 82 is in locking position is correspondingly reduced. To precisely the same degree may the individual pushbutton assemblies 10 be more closely laterally spaced than has heretofore been feasible. Moreover, since the key extension 104 slides over both sides of the key body 60, the portion 106 thereof closes the left hand side of the aperture 76 when the parts are in the position shown in FIG. 6, thus retaining the locking lever 82 in unlocked position and preventing it from becoming displaced or from interfering with other parts of the apparatus. The spring 94 is specially constructed, in combination with the other parts, so as to reliably retain the locking lever 84 against its fulcrum and bias it to its unlocking pivoted position.

By reason of the above described structure and mode of cooperation of parts, a smaller, more compact and less expensive assembly can be produced without any sacrifice in reliability or positiveness of operation.

While but a single embodiment of the present invention has been here disclosed, many variations may be made therein, all within the scope of the instant invention as defined in the following claims.

I claim:

1. In a pushbutton key device comprising a body, a cam movably mounted thereon, a locking lever mounted on said body and movable into and out of locking engagement with said cam, and a member mounted on said body and movable into and out of operative engagement with said locking lever so as to move the latter into and out of said locking engagement with said cam; the improvement which comprises said body having an aperture beneath a portion of said locking lever remote from said cam and into which said locking lever portion is receivable, said member having a first portion extending over said body beyond one end of said aperture, a second portion extending under said body beyond the other end of said aperture, and a third portion extending through said aperture and connecting said first and second portions.

2. In the device of claim 1, a biasing spring for said locking lever comprising a first part secured to said body, a second part engaged with said locking lever adjacent said cam and there biasing said lever in one direction relative to said body, and a looped part extending around said locking lever and engaging said locking lever and there biasing said lever in the opposite direction relative to said body.

3. In the device of claim 1, a biasing spring for said locking lever comprising a first part secured to said body, a second part engaged with the lower surface of said locking lever adjacent said cam and there biasing said lever away from said body, and a looped part extending around said locking lever and engaging the upper surface of said locking lever and there biasing said lever toward said body.

4. In a pushbutton key device comprising a body, a cam movably mounted thereon, a locking lever mounted on said body and movable into and out of locking engagement with said cam, and a member mounted on said body and movable into and out of operative engagement with said locking lever so as to move the latter into and out of said locking engagement with said cam; the improvement which comprises said body having an aperture beneath a portion of said locking lever remote from said cam and into which said locking lever portion is receivable, said member having a first portion extending over said body beyond one end of said aperture, a second portion extending under said body beyond the other end of said aperture, and a third portion extending through said aperture and connecting said first and second portions, said third portion including a raised part engageable with said locking lever portion to move the locking lever into said locking engagement with said cam.

5. In a device of claim 4, a biasing spring for said locking lever comprising a first part secured to said body, a second part engaged with said locking lever adjacent said cam and there biasing said lever in one direction relative to said body, and a looped part extending around said locking lever and engaging said locking lever and there biasing said lever in the opposite direction relative to said body.

6. In the device of claim 4, a biasing spring for said locking lever comprising a first part secured to said body, a second part engaged with the lower surface of said locking lever adjacent said cam and there biasing said lever away from said body, and a looped part extending around said locking lever and engaging the upper surface of said locking lever and there biasing said lever toward said body.

7. In a pushbutton key device comprising a body, a cam movably mounted thereon, a locking lever mounted on said body and movable into and out of locking engagement with said cam, and a member mounted on said body and movable into and out of operative engagement with said locking lever so as to move the latter into and out of said locking engagement with said cam; the improvement which comprises said locking lever being pivotally mounted on said body overlying said cam, said body having an aperture beneath a portion of said locking lever remote from said cam and into which said locking lever portion is receivable, said member having a first portion extending over said body beyond one end of said aperture, a second portion extending under said body beyond the other end of said aperture, and a third portion extending through said aperture and connecting said first and second portions.

8. In the device of claim 7, a biasing spring for said locking lever comprising a first part secured to said body, a second part engaged with said locking lever adjacent said cam and there biasing said lever in one direction relative to said body, and a looped part extending around said locking lever and engaging said locking lever and there biasing said lever in the opposite direction relative to said body.

9. In the device of claim 7, a biasing spring for said locking lever comprising a first part secured to said body, a second part engaged with the lower surface of said locking lever adjacent said cam and there biasing said lever away from said body, and a looped part extending around said locking lever and engaging the upper surface of said locking lever and there biasing said lever toward said body.

10. In a pushbutton key device comprising a body, a cam movably mounted thereon, a locking lever mounted on said body and movable into and out of locking engagement with said cam, and a member mounted on said body and movable into and out of operative engagement with said locking lever so as to move the latter into and out of said locking engagement with said cam; the improvement which comprises said locking lever being pivotally mounted on said body overlying said cam, said body having an aperture beneath a portion of said locking lever remote from said cam and into which said locking lever portion is receivable, said member having a first portion extending over said body beyond one end of said aperture, a second portion extending under said body beyond the other end of said aperture, and a third portion extending through said aperture and connecting said first and second portions, said third portion including a raised part engageable with said locking lever portion to move the locking lever into said locking engagement with said cam.

11. In the device of claim 10, a biasing spring for said locking lever comprising a first part secured to said body, a second part engaged with said locking lever adjacent said cam and there biasing said lever in one direction relative to said body, and a looped part extending around said locking lever and engaging said locking lever and there biasing said lever in the opposite direction relative to said body.

12. In the device of claim 10, a biasing spring for said locking lever comprising a first part secured to said body, a second part engaged with the lower surface of said locking lever adjacent said cam and there biasing said lever away from said body, and a looped part extending around said locking lever and engaging the upper surface of said locking lever and there biasing said lever toward said body.

References Cited in the file of this patent

UNITED STATES PATENTS

| | | |
|---|---|---|
| 2,266,711 | Crosby et al. | Dec. 16, 1941 |
| 2,770,137 | Sacre | Nov. 13, 1956 |
| 2,793,531 | Thompson | May 28, 1957 |
| 2,811,045 | Thompson | Oct. 29, 1957 |
| 2,898,767 | Teaf | Aug. 11, 1959 |

FOREIGN PATENTS

| | | |
|---|---|---|
| 1,015,505 | Germany | Sept. 12, 1957 |